United States Patent
Kamiya

(10) Patent No.: US 7,657,374 B2
(45) Date of Patent: Feb. 2, 2010

(54) IN-VEHICLE EMERGENCY REPORT APPARATUS

(75) Inventor: Shinji Kamiya, Kariya (JP)

(73) Assignee: Denso Corporation, Kariya (JP)

( * ) Notice: Subject to any disclaimer, the term of this patent is extended or adjusted under 35 U.S.C. 154(b) by 205 days.

(21) Appl. No.: 12/072,220

(22) Filed: Feb. 25, 2008

(65) Prior Publication Data

US 2008/0203814 A1 Aug. 28, 2008

(30) Foreign Application Priority Data

Feb. 27, 2007 (JP) ............................. 2007-047291

(51) Int. Cl.
*B60R 16/02* (2006.01)
*G08B 25/10* (2006.01)
*G06F 19/00* (2006.01)

(52) U.S. Cl. ..................... 701/301; 701/34; 701/45; 455/423; 340/436

(58) Field of Classification Search ............... 701/301, 701/2, 29, 30, 33, 34, 45; 340/436, 425.5; 455/423, 450, 404.1, 404.2
See application file for complete search history.

(56) References Cited

U.S. PATENT DOCUMENTS 6,661,116 B1 12/2003 Seto

| 2003/0117274 | A1* | 6/2003 | Kuragaki et al. ............ 340/436 |
|---|---|---|---|
| 2004/0075345 | A1 | 4/2004 | Yoshioka et al. |
| 2005/0125117 | A1* | 6/2005 | Breed ........................... 701/29 |
| 2007/0087756 | A1* | 4/2007 | Hoffberg ..................... 455/450 |

FOREIGN PATENT DOCUMENTS

| JP | 2007-079950 | 3/2000 |
|---|---|---|
| JP | 2000-222659 | 8/2000 |
| JP | 2000-322677 | 11/2000 |
| JP | 2001-006070 | 1/2001 |
| JP | 2007-183865 | 7/2007 |
| JP | 4245059 | 1/2009 |
| WO | WO 01/81120 | 11/2001 |

* cited by examiner

*Primary Examiner*—Tan Q Nguyen
(74) *Attorney, Agent, or Firm*—Harness, Dickey & Pierce, PLC

(57) ABSTRACT

An in-vehicle emergency report apparatus is so constructed that the operating power source is switched from a vehicle battery to an auxiliary battery only when a pre-crash safety ECU determines that a vehicle will collide with something. That is, the operating power source is switched from the vehicle battery to the auxiliary battery only when there is a possibility that the vehicle will collide with something to thereby perform emergency report operation. This makes it possible to effectively switch the operating power source from the vehicle battery to the auxiliary battery and to prevent the capacity of the auxiliary battery from being uselessly consumed.

6 Claims, 3 Drawing Sheets

IN-VEHICLE EMERGENCY REPORT APPARATUS

CROSS REFERENCE TO RELATED APPLICATION

This application is based on and incorporates herein by reference Japanese Patent Application No. 2007-47291 filed on Feb. 27, 2007.

FIELD OF THE INVENTION

The present invention relates to an in-vehicle emergency report apparatus.

BACKGROUND OF THE INVENTION

There are in-vehicle emergency report apparatuses so constructed that emergency report operation can be performed with reliability when a starting trigger for emergency report operation occurs. For this purpose, these in-vehicle emergency report apparatuses are so constructed that the following operation is performed: when the supply voltage of a vehicle battery drops, for example, on starting an engine, the operating power source is switched from the vehicle battery to an auxiliary battery.

(Refer to Patent Document 1, for example.)

Patent Document 1: JP 2000-322677 A (corresponding to US2004/0075345 A1)

When the operating power source is frequently switched from a vehicle battery to an auxiliary battery, the capacity of the auxiliary battery is accordingly reduced. To reduce the burden of replacing an auxiliary battery in addition to other purposes, it is desirable to minimize the frequency of operation of switching the operating power source from the vehicle battery to the auxiliary battery. The technique disclosed in Patent Document 1 is so constructed that the operating power source is switched from the vehicle battery to the auxiliary battery each time the supply voltage of the vehicle battery drops, for example, on starting the engine. This operation is performed even though it has no relationship whatsoever with emergency report operation. Therefore, the operating power source cannot be effectively switched from the vehicle battery to the auxiliary battery, and this uselessly consumes the capacity of the auxiliary battery.

SUMMARY OF THE INVENTION

The present invention has been made in consideration of the foregoing. An object of the present invention is to provide an in-vehicle emergency report apparatus where the operating power source can be effectively switched from a vehicle battery to an auxiliary battery and the capacity of the auxiliary battery can be prevented from being uselessly consumed.

According to a first example of the present invention, an emergency report apparatus for a vehicle is provided as follows. A power supplying device is configured to switch between (i) a vehicle battery power supply state in which power supplied from a vehicle battery is used as operating power and (ii) an auxiliary battery power supply state in which power supplied from an auxiliary battery is used as operating power. A control circuit is configured to (i) acquire a result of determination by a collision possibility determining unit that determines whether or not there is a possibility that the vehicle will collide with something and a result of determination by a collision determining unit that determines whether or not the vehicle has collided with something, and (ii) perform an emergency report operation when the collision determining unit determines that the vehicle has collided with something. Here, the control circuit causes the power supplying device to make a transition from the vehicle battery power supply state to the auxiliary battery power supply state only when the collision possibility determining unit determines that there is a possibility that the vehicle will collide with something in the vehicle battery power supply state. The control circuit causes the collision determining unit to use power supplied from the auxiliary battery as operating power and determine whether or not the vehicle has collided with something.

According to a second example of the present invention, an emergency report apparatus for a vehicle is provided as follows. A power supplying device is configured to switch between (i) a vehicle battery power supply state in which power supplied from a vehicle battery is used as operating power and (ii) an auxiliary battery power supply state in which power supplied from an auxiliary battery is used as operating power. A control circuit is configured to (i) acquire a result of determination by a collision possibility determining unit for determining whether or not there is a possibility that a vehicle will collide with something and a result of determination by a collision determining unit for determining whether or not the vehicle has collided with something, (ii) perform emergency report operation when the collision determining unit determines that the vehicle has collided with something, and (iii) operate by switching an operation mode between a normal operation mode and a low-power consumption operation mode in which less power is consumed than in the normal operation mode. Here, when the collision possibility determining unit determines that there is a possibility that the vehicle will collide with something in the normal operation mode, the control circuit switches from the normal operation mode to the low-power consumption operation mode and causes the collision determining unit to determine whether or not the vehicle has collided with something in the low-power consumption operation mode. Only when the collision determining unit determines that the vehicle has collided with something, the control circuit causes the power supplying device to make a transition from the vehicle battery power supply state to the auxiliary battery power supply state and performs an emergency report operation using power supplied from the auxiliary battery as operating power.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
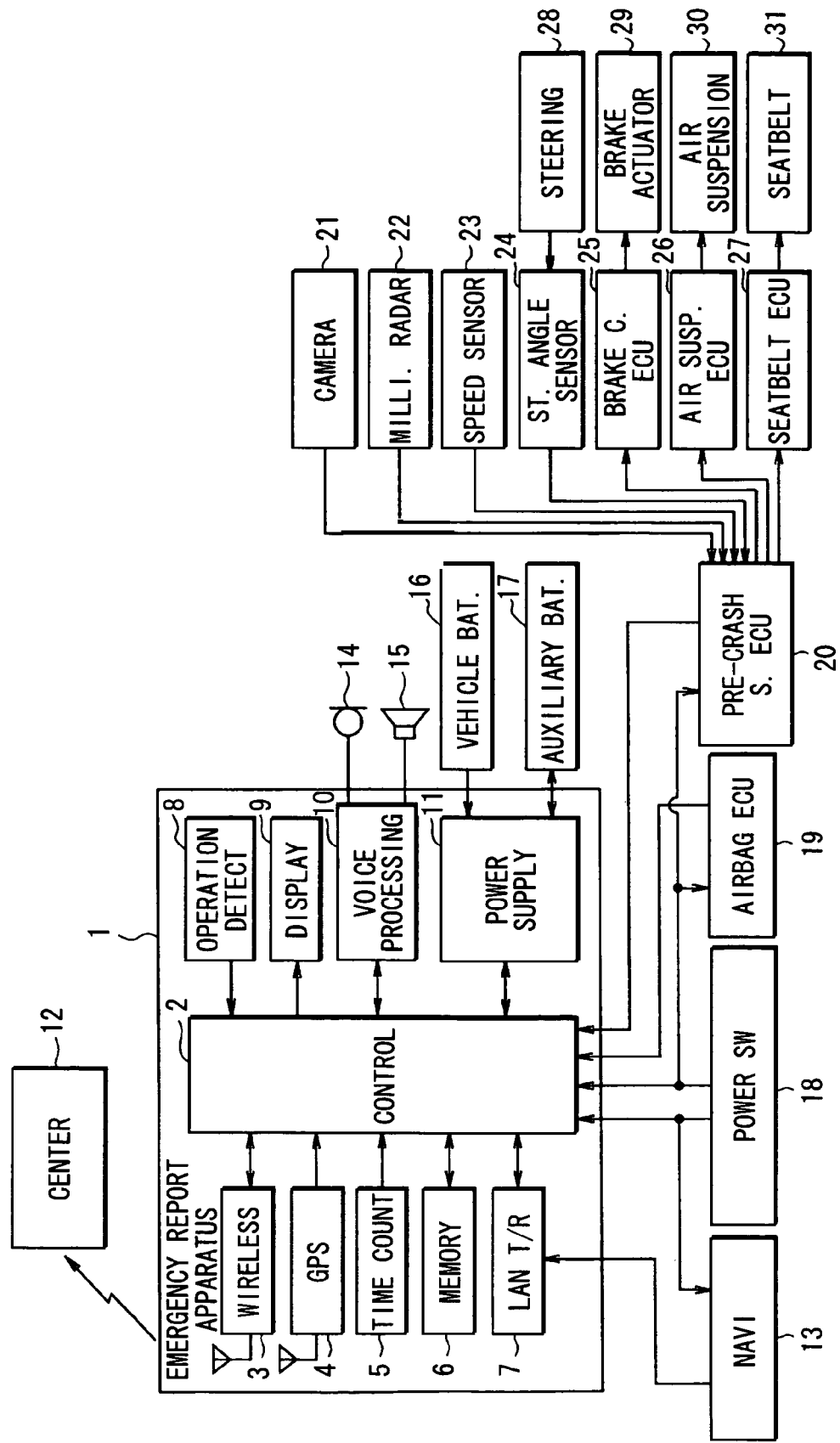
FIG. 1 is a functional block diagram of an in-vehicle emergency report apparatus according to a first embodiment of the present invention.
Figure 2:
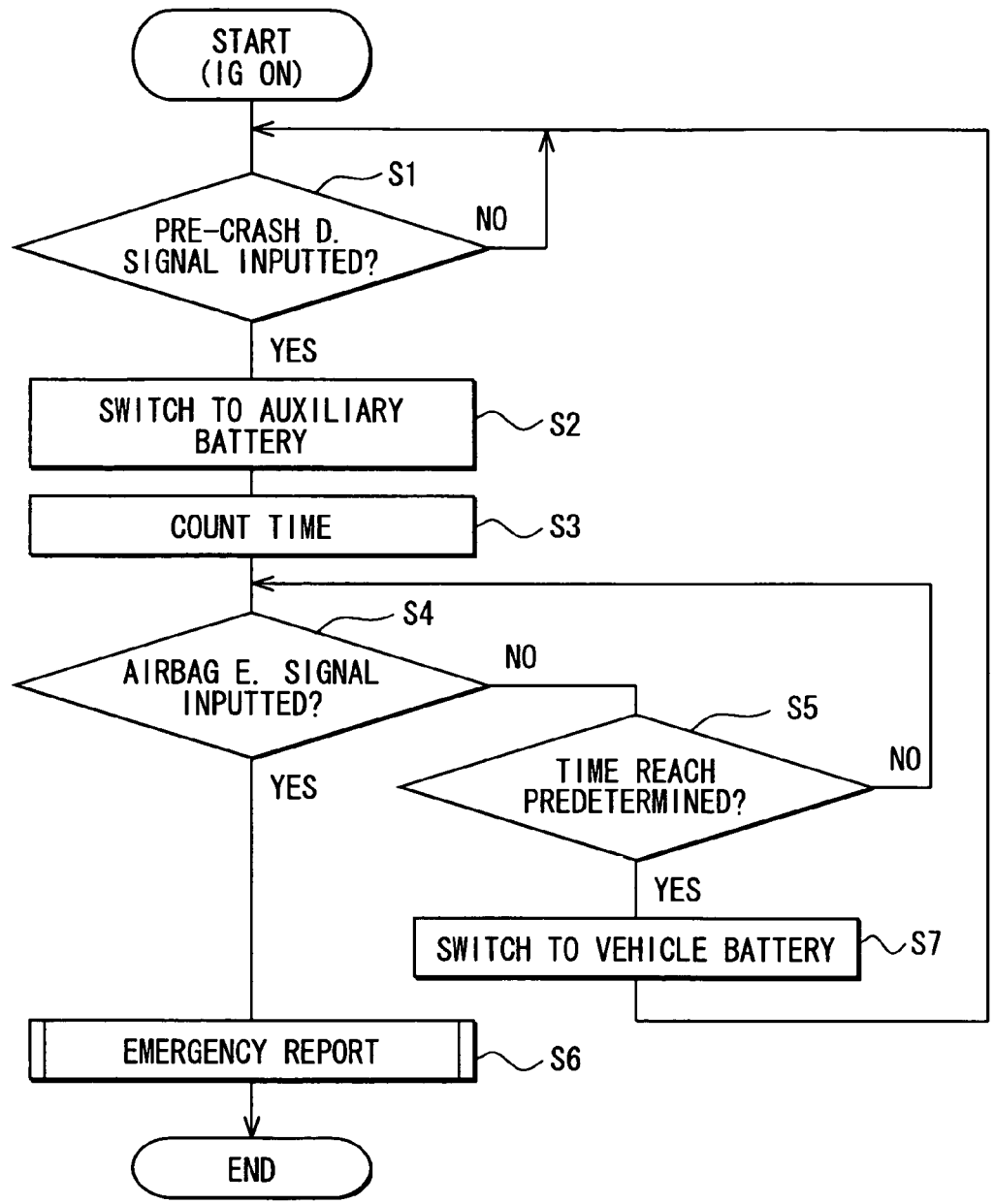
FIG. 2 is a flowchart according to the first embodiment.

Hereafter, description will be given to a first embodiment of the present invention with reference to FIG. 1 and FIG. 2. FIG. 1 illustrates the overall configuration of an in-vehicle emergency report apparatus in the form of functional block diagram. The in-vehicle emergency report apparatus 1 is constructed of: a control circuit 2 (functioning as a control means), a wireless communication device 3, a GPS (Global Positioning System) positioning device 4, a time counting device 5 (functioning as a time counting means), a memory device 6, a LAN transmission/reception device 7, an operation detection device 8 (functioning as an operation detecting means), a display device 9, a voice processing device 10, and a power supply device 11 (functioning as a power supplying means).

The control circuit 2 is constructed based on CPU and controls the overall operation of the in-vehicle emergency report apparatus 1. When the wireless communication device 3 is inputted with an emergency report command from the control circuit 2, it performs the following operation: it establishes an audio communication link with a service center 12 and transmits an emergency report signal to the service center 12 through a radio communication network. In this case, the wireless communication device 3 switches between verbal communication and data communication with the audio link kept established so that the following can be implemented: verbal communication and data communication can be carried out between a user in the vehicle compartment and an operator manned in the service center 12.

When the GPS positioning device 4 receives a GPS signal transmitted from a GPS satellite, it extracts a parameter from the GPS signal and carries out computation (fixes a position) to obtain position information. When the time counting device 5 is inputted with a time count command from the control circuit 2, it counts time. The memory device 6 stores varied memory information. The LAN transmission/reception device 7 receives and acquires position information detected by a navigation system 13. The position information received and acquired from the navigation system 13 by the LAN transmission/reception device 7 is higher in accuracy than the position information obtained by the GPS positioning device 4 fixing a position. This is because the navigation system 13 uses a G sensor, a vehicle speed, and the like in addition to a GPS signal to detect position information.

When the operation detection device 8 determines that the user has conducted a predetermined operation, it outputs an operation detection signal to the control circuit 2. When the display device 9 is inputted with a display command from the control circuit 2, it displays display information corresponding to the display command. The voice processing device 10 processes transmitted voice inputted by a microphone 14 or received voice outputted by a speaker 15. The user can use the microphone 14 and the speaker 15 to have a conversation with the operator manned in the service center 12. Then, the user can verbally ask for help or report the severity of an accident.

The power supply device 11 selectively switches the state of power supply between a vehicle battery power supply state and an auxiliary battery power supply state. In a vehicle battery power supply state, the in-vehicle emergency report apparatus 1 is operated using power supplied from a vehicle battery 16 as operating power. In an auxiliary battery power supply state, the in-vehicle emergency report apparatus 1 is operated using power supplied from an auxiliary battery 17 constructed of, for example, a primary battery as operating power.

A power switch 18 includes an IG (Ignition) switch and an ACC (Accessory) switch. It outputs an IG signal indicating turn-on/off of the IG switch to the control circuit 2, an airbag ECU 19 (functioning as a collision determining means or unit), and a pre-crash safety ECU 20 (functioning as a collision possibility determining means or unit). Here, ECU is referred to as an electronic control unit. Further, it outputs an ACC signal indicating turn-on/off of the ACC switch to the control circuit 2 and the navigation system 13. The control circuit 2 switches between normal operation and standby operation in conjunction with turn-on/off of an ACC signal from the power switch 18. The navigation system 13 is started or stopped in conjunction with turn-on/off of an ACC signal from the power switch 18. The airbag ECU 19 is connected with an airbag (not shown) and operates when input of an IG signal from the power switch 18 is on. When the airbag is expanded, the airbag ECU outputs an airbag expansion signal to the control circuit 2.

The pre-crash safety ECU 20 is connected with a camera 21, a millimeter wave radar 22, a vehicle speed sensor 23, a steering angle sensor 24, a brake control ECU 25, an air suspension ECU 26, and a seatbelt ECU 27. When input of an IG signal from the power switch 18 is on, the pre-crash safety ECU operates. It analyzes, for example, an image inputted from the camera 21, a radar detection signal inputted from the millimeter wave radar 22, a vehicle speed signal inputted from the vehicle speed sensor 23, and a steering angle signal indicating the steering angle of a steering system 28 inputted from the steering angle sensor 24. It thereby determines whether or not there is a possibility that the vehicle will collide with, for example, a vehicle ahead, an obstacle, or the like. When the pre-crash safety ECU determines that there is a possibility that the vehicle will collide with something, it outputs a pre-crash detection signal to the control circuit 2. Further, it actuates a brake actuator 29 through the brake control ECU 25 and an air suspension 30 through the air suspension ECU 26 and causes a seatbelt to be taken up through the seatbelt ECU 27. Thus, it prepares for cushioning impact that will be exerted when the vehicle collides with something. The pre-crash safety ECU 20 is also connected with a combination meter (not shown). When it is determined that there is a possibility that the vehicle will collide with something, the pre-crash safety ECU causes the combination meter to display a warning.

When the control circuit 2 determines, for example, that an airbag expansion signal has been inputted as a starting trigger for emergency report operation from the airbag ECU 19, it starts emergency report operation. In emergency report operation, the control circuit causes the wireless communication device 3 to transmit an emergency report signal to the service center 12 through a radio communication network. This emergency report signal contains position information obtained by the GPS positioning device 4 fixing a position and position information received and acquired from the navigation system 13 by the LAN transmission/reception device 7. Further, the control circuit 2 outputs a power supply command to the power supply device 11 and thereby switches the operating power source from the vehicle battery 16 to the auxiliary battery 17. The control circuit interrupts output of a power supply command to the power supply device 11 and thereby switches (returns) the operating power source from the auxiliary battery 17 to the vehicle battery 16.

Description will be given to the operation of the above-mentioned construction with reference to FIG. 2.

When input of an IG signal is on in the in-vehicle emergency report apparatus 1, the control circuit 2 determines whether or not a pre-crash detection signal has been inputted from the pre-crash safety ECU 20. When the control circuit 2 determines that a pre-crash detection signal has been inputted from the pre-crash safety ECU 20 ("YES" at S1), it outputs a power supply command to the power supply device 11. It thereby switches the operating power source from the vehicle battery 16 to the auxiliary battery 17 (S2) and causes the time counting device 5 to start time count (S3).

Subsequently, the control circuit 2 determines whether or not an airbag expansion signal has been inputted from the airbag ECU 19 (S4) and further determines whether or not the time that has elapsed after it caused the time counting device 5 to start time count. That is, the control circuit 2 determines whether or not the time that has elapsed after the operating power source was switched from the vehicle battery 16 to the auxiliary battery 17 has reached a predetermined time (S5). The predetermined time cited here is a time from when the pre-crash safety ECU 20 determine that there is a possibility that the vehicle will collide with something to when it can be determined that the possibility of a vehicle collision has been eliminated. For example, the predetermined time may be a time set beforehand by a worker at the time of factory shipment or product delivery or may be a time arbitrarily set by the user after the time of product purchase.

When the control circuit 2 determines that an airbag expansion signal has been inputted from the airbag ECU 19 before the time that has elapsed after the time counting device 5 was caused to start time count reaches the predetermined time ("YES" at S4), it performs the following operation: the control circuit starts emergency report operation using power supplied from the auxiliary battery 17 as operating power (S6). Meanwhile, when the control circuit 2 determines that the time that has elapsed after the time counting device 5 was caused to start time count has reached the predetermined time without input of an airbag expansion signal from the airbag ECU 19 ("YES" at S5), it performs the following operation: the control circuit interrupts output of the power supply command to the power supply device 11 and thereby switches (returns) the operating power source from the auxiliary battery 17 to the vehicle battery 16 (S7). Then, the control circuit returns to S1.

In the above description, the following case has been taken as an example: a case where the operating power source is switched from the auxiliary battery 17 to the vehicle battery 16 when an airbag expansion signal has not been inputted from the airbag ECU 19 and the time that has elapsed after the time counting device 5 was caused to start time count reaches the predetermined time. The operating power source may be switched from the auxiliary battery 17 to the vehicle battery 16 under any other condition. For example, the operating power source can be switched from the auxiliary battery 17 to the vehicle battery 16 on any of the following occasions: when the vehicle speed is reduced to zero (when the vehicle is stopped); when the vehicle speed is reduced to such a level that no problem will arise even if a vehicle accident occurs; when the following distance measured by the millimeter wave radar 22 is increased to a level sufficient to determine it to be safe; when it can be determined that an vehicle accident has been successfully avoided by steering operation; and the like.

According to the first embodiment, as described up to this point, the in-vehicle emergency report apparatus 1 is so constructed that the following is implemented: the operating power source is switched from the vehicle battery 16 to the auxiliary battery 17 only when the pre-crash safety ECU 20 determines that there is a possibility that the vehicle will collide with something; that is, this switching operation is performed only when there is a possibility that the vehicle will collide with something and emergency report operation will be performed. Therefore, the operating power source can be effectively switched from the vehicle battery 16 to the auxiliary battery 17 and the capacity of the auxiliary battery 17 can be prevented from being uselessly consumed.

As mentioned above, the in-vehicle emergency report apparatus is so constructed that the operating power source is switched from the vehicle battery 16 to the auxiliary battery 17 before the vehicle collides with something. This makes it possible to obviate necessity for a capacitor or the like as a backup in case the vehicle should collide with something and power supply from the vehicle battery 16 should be interrupted. Further, the in-vehicle emergency report apparatus is so constructed that the operating power source is returned from the auxiliary battery 17 to the vehicle battery 16 on the following occasion: when the airbag ECU 19 has not determined that the vehicle has collided with something and the time that has elapsed after the operating power source was switched from the vehicle battery 16 to the auxiliary battery 17 reaches a predetermined time. Therefore, the time for which the capacity of the auxiliary battery 17 is uselessly consumed can be reduced as much as possible.

Second Embodiment

Figure 3:
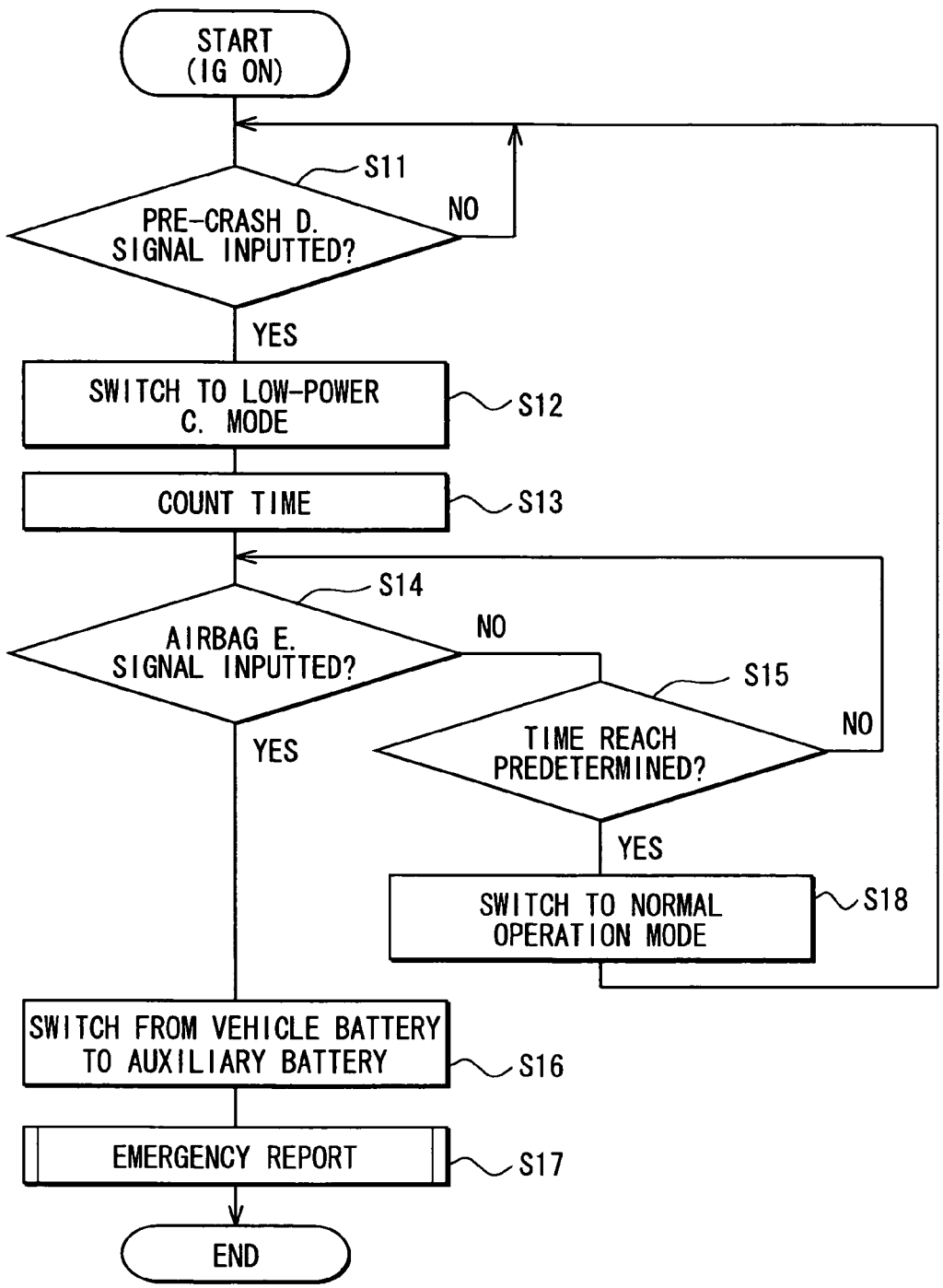
FIG. 3 is a flowchart according to a second embodiment of the present invention.

Description will be given to a second embodiment of the present invention with reference to FIG. 3. The description of the same portions as in the first embodiment will be omitted, and description will be given to a difference. The first embodiment is so constructed that when a pre-crash detection signal is inputted from the pre-crash safety ECU 20, the operating power source is switched from the vehicle battery 16 to the auxiliary battery 17. Meanwhile, the second embodiment is so constructed that when an airbag expansion signal is inputted from the airbag ECU 19, the operating power source is switched from the vehicle battery 16 to the auxiliary battery 17.

More specific description will be given. The control circuit 2 is so constructed that it can selectively switch the operation mode between normal operation mode and low-power consumption operation mode in which less power is consumed than in normal operation when it operates. (In normal operation mode, operation is performed on an operating current of, for example, several hundred milliamperes.) (In low-power consumption operation mode, operation is performed on an operating current of, for example, several milliamperes.) When input of an IG signal is on in this case, the control circuit 2 operates as follows: when it determines that a pre-crash detection signal has been inputted from the pre-crash safety ECU 20 ("YES" at S11), it switches the operation mode from normal operation mode to low-power consumption operation mode and operates in low-power consumption operation mode (S12); and then, it causes the time counting device 5 to start time count (S13).

Subsequently, the control circuit 2 determines whether or not an airbag expansion signal has been inputted from the airbag ECU 19 (S14). Further, it determines whether or not the time that has elapsed after the time counting device 5 was caused to start time count has reached a predetermined time. That is, it determines whether or not the time that has elapsed after the operation mode was switched from normal operation mode to low-power consumption operation mode has reached a predetermined time (S15). The predetermined time cited here is the same as the predetermined time described in relation to the first embodiment.

When the control circuit 2 determines that an airbag expansion signal has been inputted from the airbag ECU 19 before the time that has elapsed after the time counting device 5 was caused to start time count reaches the predetermined time ("YES" at S14), it performs the following operation: it outputs a power supply command to the power supply device 11 and switches the operating power source from the vehicle battery 16 to the auxiliary battery 17 (S16); and it starts emergency report operation using power supplied from the auxiliary battery 17 as operating power (S17). Meanwhile, when the control circuit 2 determines that the time that has elapsed after the time counting device 5 was caused to start time count has reached the predetermined time without input of an airbag expansion signal from the airbag ECU 19 ("YES" at S15), it performs the following operation: it switches (returns) the operation mode from low-power consumption operation mode to normal operation mode and operates in normal operation mode (S18); and then it returns to S11.

Also in this description, the following case has been taken as an example: a case where when an airbag expansion signal has not been inputted from the airbag ECU 19 and the time that has elapsed after the time counting device 5 was caused to start time count reaches the predetermined time, the operation mode is switched from low-power consumption operation mode to normal operation mode. The operation mode may be switched from low-power consumption operation mode to normal operation mode under any other condition. For example, the operation mode can be switched from low-power consumption operation mode to normal operation mode on any of the following occasions: when the vehicle speed is reduced to zero (when the vehicle is stopped); when the vehicle speed is reduced to such a level that no problem will arise even if a vehicle accident occurs; when the following distance measured by the millimeter wave radar 22 is increased to a level sufficient to determine it to be safe; when it can be determined that an vehicle accident has been successfully avoided by steering operation; and the like.

According to the second embodiment, as described up to this point, the in-vehicle emergency report apparatus 1 is so constructed that the following is implemented: the operating power source is switched from the vehicle battery 16 to the auxiliary battery 17 only when the airbag ECU 19 determines that the vehicle has collided with something. As in the first embodiment, therefore, the operating power source can be effectively switched from the vehicle battery 16 to the auxiliary battery 17, and the capacity of the auxiliary battery 17 can be prevented from being uselessly consumed.

Further, the in-vehicle emergency report apparatus is so constructed that the following operation is performed when the pre-crash safety ECU 20 determines that there is a possibility that the vehicle will collide with something. That is, it is so constructed that the following operation is performed when there is a possibility that the vehicle will collide with something and emergency report operation will be performed: the operation mode is switched from normal operation mode to low-power consumption operation mode and it is determined whether or not the vehicle has collided with something in low-power consumption operation mode. Therefore, it can be determined whether or not the vehicle has collided with something with less power consumed than in normal operation.

As mentioned above, the in-vehicle emergency report apparatus is so constructed that the operation mode is switched from normal operation mode to low-power consumption operation mode and operation is performed in low-power consumption operation mode before the vehicle collides with something. This makes it possible to use a built-in capacitor of a small capacitance as a backup in case the vehicle should collide with something and power supply from the vehicle battery 16 should be interrupted without separately preparing a large-capacitance capacitor, for example. Further, the in-vehicle emergency report apparatus is so constructed that the operation mode is returned from low-power consumption operation mode to normal operation mode on the following occasion: when the airbag ECU 19 has not determined that the vehicle has collided with something and the time that has elapsed after the operation mode was switched from normal operation mode to low-power consumption operation mode reaches a predetermined time. Therefore, the time for which operation is performed in low-power consumption operation mode can be shortened as much as possible.

Other Embodiments

The present invention is not limited to the above embodiments, and it can be modified or expanded as described below:

The in-vehicle emergency report apparatus 1 may be constructed as a single device or may be incorporated as a module into a vehicle.

Aside from the airbag system, any other system may be applied as a starting trigger or trigger signal for emergency report operation.

The first embodiment is so constructed that when a pre-crash detection signal is inputted from the pre-crash safety ECU 20, the combination meter is caused to display a warning. At this time, the display device 9 may be simultaneously caused to display that the operating power source has been switched from the vehicle battery 16 to the auxiliary battery 17 to inform the user of this.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

(Aspects)

Aspects of the disclosure described herein are set out in the following clauses.

According to a first aspect of the disclosure, an in-vehicle emergency report apparatus is provided as follows. A control circuit causes a power supplying device to make a transition from a vehicle battery power supply state to an auxiliary battery power supply state only when the following takes place: the power supplying device is in a vehicle battery power supply state and a collision possibility determining unit determines that there is a possibility that the vehicle will collide with something. Then, the control circuit causes a collision determining unit to use power supplied from the auxiliary battery as operating power and determine whether or not the vehicle has collided with something.

Thus, the operating power source is switched from the vehicle battery to the auxiliary battery only when the collision possibility determining unit determines that there is a possibility that the vehicle will collide with something. That is, the operating power source is switched from the vehicle battery to the auxiliary battery only when there is a possibility that the vehicle will collide with something and emergency report operation will be performed. Therefore, the operating power source can be effectively switched from the vehicle battery to the auxiliary battery, and the capacity of the auxiliary battery can be prevented from being uselessly consumed. Since the operating power source is switched from the vehicle battery to the auxiliary battery before the vehicle collides with something, as mentioned above, the following can be implemented: it is possible to obviate necessity for a charging and discharging means (e.g., a capacitor) as a backup in case the vehicle should collide with something and power supply from the vehicle battery should be interrupted.

According to an additional feature of the first aspect of the in-vehicle emergency report apparatus, the control circuit may perform the following operation after it causes the power supplying device to make a transition from a vehicle battery power supply state to an auxiliary battery power supply state: when the collision possibility determining unit determines that there is no possibility that the vehicle will collide with something, the control circuit causes the power supplying device to return from an auxiliary battery power supply state to a vehicle battery power supply state. Thus, when there is no possibility that the vehicle will collide with something, the operating power source is switched from the auxiliary battery to the vehicle battery. Therefore, the power supplying device can be swiftly returned to a state in which it was before it was caused to make a transition from a vehicle battery power supply state to an auxiliary battery power supply state. Thus, the time for which the capacity of the auxiliary battery is uselessly consumed can be shortened as much as possible.

According to a further additional feature of the first aspect of the in-vehicle emergency report apparatus, a time counting device may count the time that has elapsed after the control circuit caused the power supplying device to make a transition from a vehicle battery power supply state to an auxiliary battery power supply state. When the collision determining unit has not determined that the vehicle has collided with something and the elapsed time counted by the time counting device reaches a predetermined time, the control circuit may determine that there is no possibility that the vehicle will collide with something. Then, it may cause the power supplying device to return from an auxiliary battery power supply state to a vehicle battery power supply state. Thus, the following can be implemented by setting as the predetermined time a time after the elapse of which it can be determined that the possibility of a vehicle collision has been eliminated: the time for which the capacity of the auxiliary battery is uselessly consumed can be shortened as much as possible.

According to a second aspect, an in-vehicle emergency report apparatus is provided as follows. A control circuit selectively switches the operation mode between normal operation mode and low-power consumption operation mode in which less power is consumed than in normal operation when it operates. When a collision possibility determining unit determines that there is a possibility that the vehicle will collide with something while the control circuit is operating in normal operation mode, the control circuit switches the operation mode from normal operation mode to low-power consumption operation mode. In low-power consumption operation mode, the control circuit causes a collision determining unit to determine whether or not the vehicle has collided with something. Only when the collision determining unit determines that the vehicle has collided with something, the control circuit causes a power supplying device to make a transition from a vehicle battery power supply state to an auxiliary battery power supply state. Then, it performs emergency report operation using power supplied from an auxiliary battery as operating power.

Thus, only when the collision determining unit determines that the vehicle has collided with something, the operating power source is switched from the vehicle battery to the auxiliary battery. As in the first aspect, therefore, the operating power source can be effectively switched from the vehicle battery to the auxiliary battery and the capacity of the auxiliary battery can be prevented from being uselessly consumed. When the collision possibility determining unit determines that there is a possibility that the vehicle will collide with something, the following operation is performed. That is, when there is a possibility that the vehicle will collide with something and emergency report operation will be performed, the following operation is performed: the operation mode is switched from normal operation mode to low-power consumption operation mode and in low-power consumption operation mode it is determined whether or not the vehicle has collided with something. Therefore, it is possible to determine whether or not the vehicle has collided with something with less power consumed than in normal operation. As mentioned above, the operation mode is switched from normal operation mode to low-power consumption operation mode and operation is performed in low-power consumption operation mode before the vehicle collides with something. Though a charging and discharging means as a backup is required in case the vehicle should collide with something and power supply from the vehicle battery should be interrupted, therefore, this can be addressed with a charging and discharging means with a smaller capacitance. For example, it can be addressed with a built-in capacitor with a small capacitance or the like without separately preparing a large-capacitance capacitor.

According to an additional feature of the second aspect of the in-vehicle emergency report apparatus, the control circuit may perform the following operation when the operation mode has been switched from normal operation mode to low-power consumption operation mode and it is operating in low-power consumption operation mode: when the collision possibility determining unit determines that there is no possibility that the vehicle will collide with something at this time, the control circuit returns the operation mode from low-power consumption operation mode to normal operation mode. Thus, when there is no possibility that the vehicle will collide with something, the operation mode is returned from low-power consumption operation mode to normal operation mode. Therefore, operation can be swiftly returned to a state in which it was before the operation mode was switched from normal operation mode to low-power consumption operation mode and it was performed in low-power consumption operation mode. Thus, the time for which operation is performed in low-power consumption operation mode can be shortened as much as possible.

According to a yet additional feature of the second aspect of the in-vehicle emergency report apparatus, a time counting device may count the time that has elapsed after the control circuit switched the operation mode from normal operation mode to low-power consumption operation mode. When the collision determining unit has not determined that the vehicle has collided with something and the elapsed time counted by the time counting device reaches a predetermined time, the control circuit may determine that there is no possibility that the vehicle will collide with something. Then, it may return the operation mode from low-power consumption operation mode to normal operation mode. Thus, the following can be implemented by setting as the predetermined time a time after the elapse of which it can be determined that the possibility of a vehicle collision has been eliminated: the time for which operation is performed in low-power consumption operation mode can be shortened as much as possible.

It will be obvious to those skilled in the art that various changes may be made in the above-described embodiments of the present invention. However, the scope of the present invention should be determined by the following claims.

What is claimed is:

1. An in-vehicle emergency report apparatus, the apparatus comprising:

means for switching selectively between a vehicle battery power supply state in which power supplied from a vehicle battery is used as operating power for operating the in-vehicle emergency report apparatus, and an auxiliary battery power supply state in which power supplied from an auxiliary battery is used as operating power for operating the in-vehicle emergency report apparatus; and control means for acquiring a result of determination by first means for determining whether or not there is a possibility that a vehicle will collide and a result of determination by second means for determining whether or not the vehicle has collided, and performing an emergency report operation when the second determining means determines that the vehicle has collided;

wherein the control means causes the switching means to make a transition from the vehicle battery power supply state to the auxiliary battery power supply state only when the first determining means determines that there is a possibility that the vehicle will collide in the vehicle battery power supply state, and wherein the control means causes the second determining means to determine whether or not the vehicle has collided by using power supplied from the auxiliary battery as operating power.

2. The in-vehicle emergency report apparatus according to claim 1, wherein when the first determining means determines that there is no possibility that the vehicle will collide after the switching means made a transition from the vehicle battery power supply state to the auxiliary battery power supply state, the control means returns the switching means from the auxiliary battery power supply state to the vehicle battery power supply state.

3. The in-vehicle emergency report apparatus according to claim 2, further comprising:

means for counting a time that elapses after the switching means made a transition from the vehicle battery power supply state to the auxiliary battery power supply state, wherein when the elapsed time counted by the counting means reaches a predetermined time before the second determining means determines that the vehicle has collided, the control means determines that there is no possibility that the vehicle collides and returns the switching means from the auxiliary battery power supply state to the vehicle battery power supply state.

4. An in-vehicle emergency report apparatus for a vehicle, the apparatus comprising:

means for switching selectively between a vehicle battery power supply state in which power supplied from a vehicle battery is used as operating power for operating the in-vehicle emergency report apparatus and an auxiliary battery power supply state in which power supplied from an auxiliary battery is used as operating power for operating the in-vehicle emergency report apparatus; and control means for acquiring a result of determination by first means for determining whether or not there is a possibility that a vehicle will collide and a result of determination by second means for determining whether or not the vehicle has collided, performing an emergency report operation when the second determining means determines that the vehicle has collided, and switching an operation mode between a normal operation mode and a low-power consumption operation mode in which less power is consumed than in the normal operation mode, wherein when the first determining means determines that there is a possibility that the vehicle will collide in the normal operation mode, the control means switches from the normal operation mode to the low-power consumption operation mode and causes the second determining means to determine whether or not the vehicle has collided while in the low-power consumption operation mode, and wherein only when the second determining means determines that the vehicle has collided, the control means causes the switching means to make a translation from the vehicle battery power supply state to the auxiliary battery power supply state and performs the emergency report operation using power supplied from the auxiliary battery as operating power.

5. The in-vehicle emergency report apparatus according to claim 4, wherein when the first determining means determines that there is no possibility that the vehicle will collide while operating in the low-power consumption operation mode, the control means returns the operation mode from the low-power consumption operation mode to the normal operation mode.

6. The in-vehicle emergency report apparatus according to claim 5, further comprising:

means for counting a time that elapses after the operation mode is switched from the normal operation mode to the low-power consumption operation mode, wherein when the second determining means has not determined that the vehicle has collided and the elapsed time counted by the counting means reaches a predetermined time, the control means determines that there is no possibility that the vehicle collides and returns the operation mode from the low-power consumption operation mode to the normal operation mode.

* * * * *